United States Patent [19]

Gay et al.

[11] Patent Number: 4,872,539

[45] Date of Patent: Oct. 10, 1989

[54] CLUTCH RELEASE BEARING FOR AN AUTOMOBILE VEHICLE AND MEANS FOR THE INSTALLATION THEREOF

[75] Inventors: Christian Gay, Paris; Philippe Lassiaz, Boulogne, both of France

[73] Assignee: Valeo, Paris, France

[21] Appl. No.: 218,996

[22] Filed: Jul. 14, 1988

[30] Foreign Application Priority Data

Jul. 22, 1987 [FR] France ............... 87 10362

[51] Int. Cl.[4] ............................................. F16D 23/14
[52] U.S. Cl. .................... 192/98; 192/110 B
[58] Field of Search .......... 192/98, 110 B, 70.13, 192/89 B, DIG. 1

[56] References Cited

U.S. PATENT DOCUMENTS

| | | | |
|---|---|---|---|
| 4,560,053 | 12/1985 | Lassiaz | 192/89 B X |
| 4,565,271 | 1/1986 | Lassiaz | 192/89 B |
| 4,613,027 | 9/1986 | Lassiaz et al. | 192/98 X |
| 4,632,237 | 12/1986 | Maycock et al. | 192/98 |
| 4,646,901 | 3/1987 | Lassiaz et al. | 192/109 A |
| 4,648,499 | 3/1987 | Despress et al. | 192/70.13 X |
| 4,660,701 | 4/1987 | Lassiaz et al. | 192/98 |
| 4,733,763 | 3/1988 | Gay et al. | 192/98 |

FOREIGN PATENT DOCUMENTS

| | | |
|---|---|---|
| 0110602 | 6/1984 | European Pat. Off. . |
| 2533651 | 3/1984 | France . |
| 2544037 | 10/1984 | France . |
| 2544039 | 10/1984 | France . |
| 3113463 | 12/1982 | Netherlands . |

*Primary Examiner*—Rodney H. Bonck
*Attorney, Agent, or Firm*—Charles E. Brown; Charles A. Brown

[57] ABSTRACT

A clutch release bearing intended to act by traction. The clutch release bearing is fitted with a coupling device which is elastically deformable radially. The coupling device is attached through the intermediary of a coupling piece to a declutching device of the clutch. A bearing is provided to bear on the declutching device. The bearing has a bistable resilient washer which in a waiting position holds the coupling device in a retracted position, and through the intermediary of a ring frees the coupling device in the operating position. The clutch release bearing is particularly applicable to a self-centering clutch release bearing for automobiles.

15 Claims, 1 Drawing Sheet

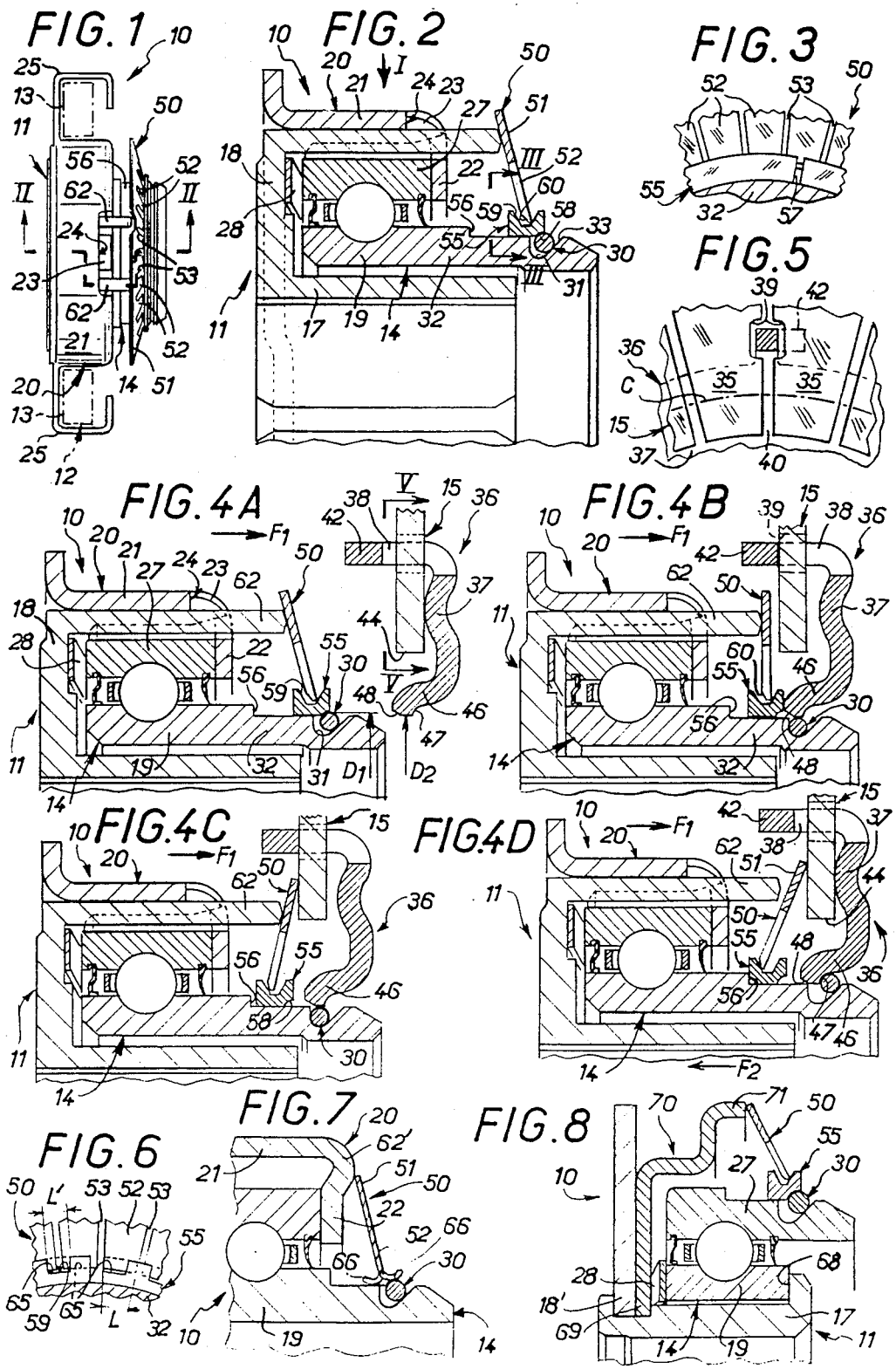

CLUTCH RELEASE BEARING FOR AN AUTOMOBILE VEHICLE AND MEANS FOR THE INSTALLATION THEREOF

BACKGROUND OF THE INVENTION

1. Field of the Invention

The present invention relates generally to clutch release bearings, especially for automobile vehicles.

As is well known, a clutch release bearing generally comprises on the one hand an operating element which is controlled by a control element such as a clutch release fork, and, on the other hand, a driving element which is coupled axially to the operating element and which is intended to act on the declutching device of the clutch.

The present invention relates more particularly to clutch release bearings of the kind referred to as "pulled" bearings, which are designed to act in traction on the declutching device of the clutch, and which, in order to do this, must be coupled to the declutching device by their driving elements.

2. Description of the Related Art

For a coupling of this kind it has already been proposed e.g. in French Pat. No. 2 544 039, to permanently fasten to the declutching device of the clutch, a substantially annular piece, here for convenience referred to simply as a connecting piece, and to employ between this connecting piece and the driving element of the clutch release bearing, a coupling device adapted to provide for the desired coupling in at least one axial direction, i.e. that corresponding to the direction of traction.

Usually, and this is the case in French Pat. No. 2 544 039, this coupling device is fitted to the driving element of the clutch release bearing in advance and, to allow the axial engagement of this device with the connecting piece, the coupling device, which is disposed annularly around the axis of the assembly and at least partly engaged with an annular groove formed in the said driving element, is elastically radially deformable so that it can pass from a relatively retracted configuration, suitable to allow axial engagement, to a relatively opened out configuration suitable to enable the subsequent coupling to be effected.

In its simplest form it may be, for example, a metallic retaining ring open at a gap. Whatever the case, at rest, during storage of the clutch release bearing and during the manipulations which must be employed for its axial engagement with the coupling piece, it is normally, without exception, in the opened out configuration. Consequently, simply as a result of gravity, it then has an eccentric position relative to the axis of the assembly.

Because the coupling device thus projects axially in an accentuated manner from the side of the clutch release bearing there is the risk during storage, which is usually done in bulk, or during manipulation, that it will be subject to premature catching on other objects, and this may eventually cause its deterioration or even breakage.

Moreover, because during the axial engagement of the clutch release bearing with the connecting piece of the declutching device of the clutch it is an eccentric position, there is the risk that it will become misaligned during this axial engagement and consequently it will not be possible to complete this correctly, or without difficulty.

Finally, in order to take into account its eccentricity and to be able to receive it correctly with complete certainty, it is necessary that the connecting piece has an entry cone of which the approach diameter is at least equal to that corresponding to this eccentricity.

As this entry cone must also enable the coupling device to be squeezed sufficiently to be retracted in order to pass into the central opening of the connecting piece, it inevitably has an axial length which is the more significant the greater its approach diameter.

Besides this resulting in an expensive increase in the axial length of the connecting piece, and of the axial space occupied by this, the shaping, on this connecting piece of an entry cone having a relatively large axial length is itself troublesome and costly.

In addition it is known, and this is also the case in French Pat. No. 2 544 039 mentioned above, to provide for the use, between the clutch release bearing and the declutching device of the clutch to be controlled, of elastic means, hereinafter for convenience referred to simply as elastic bearing means, designed to bear axially on the declutching device whilst also bearing on the driving element of the clutch release bearing, continuously to maintain an elastic bearing between the declutching device and the coupling piece and thereby to avoid any noise from this region.

An object of the present invention is to provide an arrangement which, taking advantage of these elastic bearing means, enables the disadvantages set out above to be avoided and other advantages to be attained.

SUMMARY OF THE INVENTION

More specifically, a first object of the invention is a clutch release bearing, especially for an automobile vehicle, of the kind comprising an operating element intended to be acted on by a control element, for example a clutch release fork, a driving element which, coupled axially to the operating element, is suitable to act in traction and is thus adapted to enable the assembly to exercise a pulling effect on the declutching device of the clutch to be controlled, the said driving element being provided for this purpose with a coupling device which is disposed annularly around the axis of the assembly, being at least partly engaged with an annular groove in said driving element, and which is elastically deformable radially, and elastic means, here for convenience referred to simply as elastic bearing means, which are operable to bear axially on said declutching device whilst bearing axially on said driving element, the clutch release bearing being characterized in that the elastic bearing means comprise a bistable resilient washer able to adopt either one of two stable configurations which are axially inverse, namely a first, storage, configuration in which the coupling means is kept in a relatively contracted configuration, and a second, operating, configuration in which, said coupling means is freed to bear axially on the declutching device of the clutch. The invention also provides for the installation of such a clutch release bearing.

In summary therefore, the elastic bearing means provided to come into action between the clutch release bearing and the declutching device of the clutch advantageously and economically have a dual function; besides their usual bearing function during service, they also previously ensure, whilst the clutch release bearing is in storage and during the manipulations which are applied to it for its axial engagement with the connecting peice with which it will cooperate in traction, retention of the coupling device in a relatively contracted configuration, and thus the radial engagement of this coupling device in the annular groove with which it is engaged being increased, a suitably centred retention in position of this coupling means relative to the axis of the assembly.

To this end, the bistable resilient washer used for this purpose may be adapted to cooperate directly with the coupling device.

Preferably, however, a ring which is installed to slide on the driving element of the clutch release bearing is associated with the coupling device to hold the latter in the relatively contracted configuration, and the bistable resilient washer is engaged with the ring so that it interacts with the coupling means through the intermediary of the ring.

This results in much easier manufacture and a more reliable action.

It has already been proposed, for example in German Pat. No. 31 13 463, to hold the coupling means in a retracted position by a ring whilst the clutch release bearing is awaiting use.

However, besides the fact that in this German Patent, this arrangement is applied to a clutch release bearing which, instead of having a coupling piece, is attached itself in its entirety to the declutching device of the clutch to be controlled, (thus using a method of assembling the clutch release bearing which is different to that concerned in the object of the present application) it is not associated with the use of a double function for the corresponding elastic bearing means and, with regard to the assembly of the clutch release bearing in question, no other way of performing it would be known.

The same does not apply to the present application according to which these elastic bearing means advantageously have a double function.

Be that as it may, and as a result of the arrangement in accordance with the invention, the entry cone of the coupling piece advantageously requires only a relatively small axial extension and is therefore limited to a simple chamfer.

A further advantage is that it is not necessary to provide, at the risk of making it smaller, any sort of groove in the driving element for the bearing of the bistable resilient washer constituting the elastic bearing means and/or for the ring which may be associated with it.

BRIEF DESCRIPTION OF THE DRAWINGS

FIG. 1 is, with a localized part removed, a view in elevation of a clutch release bearing in accordance with the invention seen in the direction of the arrow I in FIG. 2;

FIG. 2 is, on a larger scale, a partial view in axial section, along the broken line II—II in FIG. 1;

FIG. 3 is a partial view in transverse section along the line III—III in FIG. 2;

FIGS. 4A, 4B, 4C, 4D are partial views in axial section which, similar to that of FIG. 2, show different successive phases of axial engagement of this clutch release bearing with the coupling piece provided on the declutching device of the clutch, during assembly;

FIG. 5 is a partial view in elevation of a transverse section of the declutching device and the coupling piece along the line V—V in FIG. 4A;

FIG. 6 is a partial view in transverse section of another embodiment, corresponding to FIG. 3;

FIG. 7 is a partial view in axial section of another embodiment, corresponding to FIG. 2; and FIG. 8 is a partial view in axial section, also corresponding to that in FIG. 2, showing another embodiment of the clutch release bearing in accordance with the invention.

DESCRIPTION OF THE PREFERRED EMBODIMENTS

Referring to the drawings, a clutch release bearing 10 comprises in known manner an operating element 11 intended to be acted on by a control element, such as a clutch release fork 12, having two arms 13 disposed on either side of the operating element as shown in broken lines in FIG. 1; and a driving element 14 which is coupled axially to the operating element 11, and which as shown in FIG. 4D, is designed to act on the declutching device 15 of a clutch.

In the embodiments shown, and in a manner known per se, the operating element 11 comprises an axial sleeve 17 operable to guide the assembly on a suitable supporting member, and a transverse flange 18 extending annularly around the axis of the assembly.

Also in known manner, the driving element 14 is constituted in this example by a ball bearing. In the embodiments more specifically shown in FIGS. 1 to 7, the driving element 14 is designed to act by means of the inner race 19 of this ball bearing on the declutching device 15 of the clutch.

The driving element 14 is coupled axially to the operating element 11 by a cover 20 which, for the axial bearing of the driving element 14, comprises an inwardly-extending flange 22, directed radially towards the axis of the assembly, at the end of a cylindrical sidewall 21 surrounding the driving element 14 beyond the periphery of the operating element 11.

In order to retain this cover 20, the operating element 11 is provided with axially-extending hooks 23 projecting at intervals from its transverse flange 18 and integral therewith, which hooks, by means of individual openings 24 provided for this purpose in the cover 20 partly in the cylindrical sidewall 21 of this and partly in its flange 22, are engaged with the edge of the cylindrical sidewall 21.

In practice it is through the intermediary of this cover 20 that the clutch release fork is able to act on the operating element 11.

For this purpose the cover 20 presents at the end of its cylindrical sidewall 21 opposite its flange 22, two arms 25, in diametrically opposite positions relative to one another, both directed radially away from the axis of the assembly, each of which offers respectively a bearing for the arms 13 of the clutch release fork 12.

It is through the edge of the outer race 27 of the ball bearing that the driving element 14 bears against the flange 22 of the cover 20.

Since this embodiment comprises a self centering clutch release bearing, an annular clearance is left free between the driving element 14 and the axial sleeve 17 of the operating element 11, as well as between the driving element 14 and the hooks 23 of the operating element 11.

Since, more specifically, the bearing comprises a self centering clutch release bearing with continuous self centering, axially acting elastic means are interposed between the driving element 14 and the operating element 11. In the embodiments shown this is a corrugated washer 28, for example a corrugated washer of the kind sold under the commercial name "ONDUFLEX" which, bearing on the transverse flange 18 of the operating element 11, bears on the corresponding edge of the outer race 27 of the ball bearing constituting the driving element 14, to push this outer race 27 against the flange 22 of the cover 20.

Since this embodiment is also a "pulled" clutch release bearing, that is to say a clutch release bearing which is adapted to exert a traction on the declutching device 15 of the clutch, the driving element 14 is intended itself to exert a pulling force and in order to do this it is equipped with a coupling device 30 which is disposed annularly around the axis of the assembly and which is at least partly engaged with an annular groove 31 on the driving element 14, said coupling means being elastically deformable radially.

In the embodiments shown this coupling device 30 is constituted simply by a retaining ring, for example by a metallic retaining ring, which is open at a gap, not visible in the Figures, in order to be able to move elastically from a relatively opened out configuration, which is the rest configuration, to a relatively contracted configuration, which is the constrained configuration (prior to installation).

In the embodiments shown more specifically in FIGS. 1 to 7, the groove 31 of the driving element 14 with which the coupling device 30 is engaged is near the end of an axial extension 32 which is provided for this purpose on the inner race 19 of the ball bearing constituting the driving element 14, and that flank 33 which is situated axially furthest from the transverse flange 18 of the operating element 11 is sloped overall to this axis of the assembly, diverging from this axis increasingly as it becomes more distant from the transverse flange 18.

These arrangements are well known and, not being the object of the present invention, they will not be described in more detail here.

In a manner likewise known, the declutching device 15 of the clutch to be controlled is constituted by a diaphragm, that is to say an annular part which comprises a continuous circular peripheral part forming a Belleville washer (not visible in the Figures) and a central part divided into radial fingers 35, forming declutching levers; axially fastened to the diaphragm, permanently in both directions, but with a certain axial play, is an annular piece 36, here for convenience referred to simply as a connecting piece.

It is through the intermediary of this connecting piece 36 that the clutch release bearing 10 must be coupled to the declutching device 15.

In accordance with known arrangements which do not form the object of the present invention and which will not be described in detail here, (and which are for example of the kind described in the French Pat. No. 2 533 651), this connecting piece 36 presents, on the side of the declutching device 15 away from the clutch release bearing 10, a small bearing cup 37 through which it is adapted to bear on the declutching device 15, in practice following a circumference C shown in broken lines in FIG. 5, and to attach it to the declutching device 15 it presents at intervals on the outer periphery of this cup 37, lugs 38 which pass axially through the declutching device 15 by means of openings 39 widening circumferentially in the gaps 40 separating pairs of its radial fingers 35 and which, beyond the declutching device 15, each comprise a holding finger 42 elongated circumferentially.

At the inner periphery of the bearing cup 37 the connecting piece 36 comprises in addition, elongated axially in the central opening 44 of the declutching device 15, an axial part 46, or holding part, by which it is adapted to cooperate with the coupling device 30.

This holding part 46 comprises for this purpose a transverse shoulder 47 which, on the side away from the clutch release bearing 10 is turned axially to the shape of the coupling device 30.

At its end away from this transverse shoulder 47, the holding part 46 of the connecting piece 36 has, as a cone of entry, along its approach edge, a simple chamfer 48.

Finally, and also in known manner, elastic means are provided, which are for convenience referred to simply as elastic bearing means, which are designed to bear axially on the declutching device 15 whilst bearing on the driving element 14 of the clutch release bearing 10.

In accordance with the invention, these elastic bearing means comprise, and in practice in the embodiments shown are exclusively constituted by it, a bistable resilient washer 50 able to adopt in a stable manner either of two axially inverse configurations, namely (FIGS. 1, 2 and 4A) at first, storage configuration, in which the washer ensures the retention in a relatively contracted configuration, in which, having freed the said coupling device 30, is effectively adapted to bear axially on the declutching device 15 of the clutch.

Overall, and like a diaphragm, this bistable resilient washer 50 comprises, in the embodiments shown, a peripheral part 51 which, being circularly continuous, forms a Belleville washer, and a central part which, disposed in the prolongation of the peripheral part 51, and in one piece with this, is divided into radial lugs 52 (FIGS. 1 and 3).

In its storage configuration the bistable resilient washer 50, which is of generally frustoconical shape, has its concavity turned towards the clutch release bearing 10, and in its operating configuration it has its concavity turned in the axially opposite direction and thus towards the declutching device 15.

In the embodiments shown in FIGS. 1 to 6, it is through the intermediary of the ring 55 intended to slide on the driving element 14 and associated with the coupling device 30 for the retention of this in the relatively contracted configuration, that the bistable resilient washer 50 is adapted to cooperate with this coupling device 30 being for this purpose engaged with this ring 55.

In practice the ring 55 is adapted to slide on the axial prolongation 32 of the inner race 19 of the ball bearing constituting the driving element 14 and, towards the transverse flange 18 of the operating element 11 its course on the axial prolongation 32 is limited by a transverse shoulder 56 provided thereon.

Preferentially, and as shown, the ring 55 is split with a gap 57 (FIG. 3) and it is thus adapted to close itself elastically on the axial prolongation 32 which it encloses, but without the corresponding assembly necessarily being forced.

In the embodiments shown, the ring 55 has externally a rectangular transverse profile, but, in order to cooperate with the coupling device 30, it presents along its corresponding edge a notch 58 which axially has the shape of the coupling device.

To cooperate with the bistable resilient washer 50, the ring 55 is formed transversely at its outer periphery with a groove 59 in which the radial lugs 52 of resilient washer 50 are engaged by their ends. In practice, in the embodiments shown, this groove 59 has transversely a V-shaped profile with a flat bottom.

As will be readily understood, the gap 57 of the ring 55 enables, by movement of this into the retracted configuration, easier engagement of the resilient washer 50 in its groove 59.

For cooperation with that flank of the groove 59 which is axially on the same side as the flange 18 of the operating element 11, the corresponding corner of the radial lugs 52 of the resilient washer 50 is, in the embodiments shown, decreased by a chamfer 60.

Finally, for the axial application of the resilient washer 50 in the storage configuration, at least one projection 62 is provided which extends axially beyond the flange 22 of the cover relative to the transverse flange 18 of the operating element 11, and which in practice also extends beyond the transverse shoulder 56 designed to limit the movement of the ring 55 on the axial prolongation 32 of the inner race 19 of the ball bearing constituting the driving element 14.

In the embodiments more specifically shown in FIGS. 1 to 6, this projection 62 starts in one piece with the transverse flange 18 of the operating element 11 and passes axially through the cover 20 by means of one of the openings 24.

In practice, for each of the openings 24 of the cover 20 there are thus two projections 62 disposed respectively one on each side of the corresponding hook 23 of the operating element 11.

In the storage configuration, which corresponds to storage of the clutch release bearing 10 or to the manipulations of this prior to its engagement with the connecting piece 36 of the declutching device 15 of the clutch to be controlled, the resilient washer 50 bears, through its circularly continuous peripheral part 51, on the projections 62 (FIGS. 1, 2 and 4A).

Through the ends of its lugs 52, which are engaged with the groove 59 of the ring 55, it tends to push back elastically the ring 55 away from the transverse flange 18 of the operating element 11 and, this ring 55 being itself engaged by its notch 58 with the coupling device 30, retains the latter in a relatively contracted configuration in which, on the one hand, as a result of contact with the oblique flank of the groove 31 in which it is engaged, this coupling device 30 is situated exactly centred relative to the axis of the assembly and, on the other hand, the projection which it forms on the axial prolongation 32 concerned of the driving element 14 extends following a circumference with diameter D1 which is not more than slightly greater than the diameter D2 of the central opening of the connecting piece 36.

In this storage configuration of the resilient washer 50, the assembly formed by it, the ring 55 and the coupling means 30 is conjointly in stable equilibrium, under a slight elastic constraint. Retention of the coupling means 30 in a centred position is thus ensured.

When, in order to assemble the parts, the clutch release bearing 10 thus equipped is engaged axially, in the direction of the arrow F1 in FIGS. 4A, 4B, 4C and 4D, with the connecting piece 36, by means of the central opening of the latter, the ring 55 comes to be in abutment against the holding part 46 of this connecting piece 36, but through its chamfer 48 this holding part 46 increases further the contraction of the coupling device 30 in the groove 31 (FIG. 4B). Thus as is easy to understand, a chamfer 48 with, preferably, a relatively small axial extension, suffices to do this.

The axial engagement of the clutch release bearing 10 being continued, the ring 55 held by the connecting piece 36 slides on the axial prolongation 32 of the driving element 14 towards the transverse shoulder 56 of the latter; however, the connecting piece 36 being conjointly pushed back by the ring 55, its small bearing cup 37 loses contact with the declutching device 15, the connecting piece 36 then being held on the latter by the spurs 42 of its lugs 38 (FIG. 4B).

Increasingly with the axial engagement of the clutch release bearing 10, the bistable resilient washer 50 straightens itself until, by passing through a neutral configuration, it suddenly inverts its concavity (FIG. 4C).

It then itself pushes back ring 55 towards the transverse shoulder 56 of the driving element 14, the ring losing contact with the holding part 46 of the connecting piece 36 and, when the ring 55 has arrived to bear against the transverse shoulder 56 (FIG. 4D), the bistable resilient washer 50 itself bears on this transverse shoulder 56 until it comes to occupy its desired service configuration in which, as shown, abandoning contact with the projections 62 of the operating element 11 of the clutch release bearing 10, it bears against the declutching device 15 through its circularly continuous peripheral part 51.

Under the elastic bias which results, the small bearing cup 37 of the connecting piece 36 again comes to bear against the declutching device 15 along the circumference C and, conjointly, escaping through the axial bearing made on the central opening of the connecting piece 36, the coupling device 30 as a result of its own resilient positioning drive, hooks itself on the shoulder 47 provided for this purpose on the holding part 46 of the connecting piece 36.

Subsequently, to exert a traction on the declutching device 15, it suffices to drive the clutch release bearing 10 in traction in the direction concerned, indicated by the arrow F2 in FIG. 4D.

In the alternative embodiment shown in FIG. 6, and to facilitate manufacture by moulding, the flanks of the groove 59 of the ring 55 are produced by notches 65 which are alternated with one another circularly from one flank to the other, and which extend radially to the level of the bottom of the groove 59.

Preferably, and as shown, at least at their ends, the radial lugs 52 of the bistable resilient washer 50 then have circumferentially a width L greater than that L' of the notches 65 of the ring 55 to prevent these radial lugs 52 escaping from this ring 55.

In the alternative embodiment shown in FIG. 7 the bistable resilient washer 50 is adapted to cooperate directly with the coupling device 30. For this purpose it comprises at its inner periphery tongues 66 which are alternately directed substantially axially in one direction and the other. In practice these tongues are each individually formed by a fold in the radial lugs 52 of the washer 50 and preferably, and as shown, are generally rounded.

Moreover, in the embodiment shown in FIG. 7, the projection provided for the axial bearing of the bistable resilient washer 50 in the storage configuration is formed by a fold 62' in the cover 20, intermediate the cylindrical sidewall 21 and its flange 22.

The functioning of this alternative embodiment is identical in all respects to the preceding embodiment.

It will also be noted that, in both cases, in order to come to bear on the declutching device 15, the bistable resilient washer 50 must engage below the spurs 42 of the lugs 38 of the connecting piece 36.

Consequently, it therefore bears on the declutching device 15 along a circumference of different diameter to the circumference on which the notches 39 necessary for the lugs 38 to pass through are situated, and in practice along a smaller circumference than this.

As a result the circumference C along which the small bearing cup 37 of the connecting piece 36 itself bears against the said declutching device 15, is advantageously of lesser diameter than the circumference along which the notches 39 are situated, and therefore advantageously this is a circumference which is not affected by these notches 39.

In the embodiment shown in FIG. 8, the driving element 14 is designed to be coupled through the outer race 27 of the ball bearing to the connecting piece 36 to act in traction on the declutching device of the clutch.

The inner race 19 of this ball bearing then bears against a transverse shoulder 68 of the sleeve 17 of the operating element 11, and the corresponding axially acting elastic washer 28 itself bears on this sleeve 17 across, successively, the bottom 69 of a cup 70 the end 71 of which furnishes an axial bearing for the bistable resilient washer 50 in the storage configuration of the latter, and a transverse flange 18' suitable to provide a bearing for the arms of the associated clutch release fork 12, the said cup 70 and the said flange 18' being fastened, for example by crimping, as shown, on the said sleeve 17 at the end of the latter away from the preceding transverse shoulder 68.

The present invention is not limited to the embodiments described and shown, but encompasses all variants and combinations within the scope of the following claims.

It will be noted, however, that in all cases, the bistable resilient washer is disposed outside the ball bearing constituting the driving element of the clutch release bearing.

What is claimed is:

1. A clutch release bearing suitable for an automobile vehicle, of the kind comprising an operating element adapted to be acted on by a control element such as a clutch release fork, and a driving element connected axially to said operating element to act in traction and thus adapted to enable the assembly to exercise a pulling effect on the declutching device of the clutch to be controlled, said driving element being provided for this purpose with a coupling device disposed annularly around the axis of the assembly and being at least partly engaged with an annular groove, and being elastically deformable radially; and elastic bearing means operable to bear axially on said declutching device whilst bearing axially on said driving element, wherein said elastic bearing means comprise a bistable resilient washer capable of adopting either one of two axially inverse configurations, namely a first, storage configuration in which the washer ensures that the coupling device is kept in a relatively contracted position, and a second, operating configuration in which, having freed said coupling device, the washer is adapted to bear axially on the declutching device of the clutch.

2. A clutch release bearing according to claim 1, wherein a ring operable to slide on the driving element is associated with the coupling device to hold the coupling device in the relatively contracted configuration, the bistable resilient washer being engaged with said ring, and being adapted to cooperate with said coupling means through the intermediary of said ring.

3. A clutch release bearing according to claim 2, wherein in order to cooperate with said coupling device, said ring comprises a notch with the profile of said coupling device.

4. A clutch release bearing according to claim 2, wherein said ring is split with a gap.

5. A clutch release bearing according to claim 2, wherein said ring has a transverse groove at its outer periphery with which the bistable resilient washer is engaged.

6. A clutch release bearing according to claim 5, wherein said groove has transversely a V-shaped profile with a flat bottom.

7. A clutch release bearing according to claim 5, wherein the flanks of said groove are made by notches which alternate with one another circularly from one flank to the other, and which extend radially to the level of the bottom of said groove.

8. A clutch release bearing according to claim 7, wherein the bistable resilient washer comprises a continuously circular peripheral part forming a Belleville washer, and a central part divided into lugs, and at least at their ends, the lugs have circumferentially a width greater than that of the notches of the associated ring.

9. A clutch release bearing according to claim 1, wherein the bistable resilient washer is adapted to cooperate directly with the coupling device.

10. A clutch release bearing according to claim 9, wherein on its internal periphery, the bistable resilient washer comprises tongues which are directed substantially axially alternately in one direction and the other.

11. A clutch release bearing according to claim 10, wherein the bistable resilient washer comprises a continuously circular peripheral part forming a Belleville washer, and a central part divided into lugs, said tongues of said bistable resilient washer are each individually formed by a fold of one of said lugs.

12. A clutch release bearing according to claim 1, wherein the bistable resilient washer comprises a circularly continuous peripheral part which forms a Belleville washer, and an integral central part disposed in the prolongation of the peripheral part and divided into lugs.

13. A clutch release bearing according to claim 1, wherein said driving element is connected axially to the operating element by a cover, said driving element under the bias of axially acting elastic means axially bears against a radially inwardly-directed flange of said cover and said operating element has a transverse flange against which said axially acting elastic means axially bears; and at least one projection for the axial bearing of the bistable resilient washer in the holding position, which projection extends axially beyond said inwardly-directed flange relative to said transverse flange.

14. A clutch release bearing according to claim 13, wherein said projection is formed by a fold in the cover.

15. A clutch release bearing according to claim 13, wherein said projection is made in one piece with the transverse flange of the operating element and passes axially through an opening in said cover.

* * * * *